United States Patent
Sherstyuk

(10) Patent No.: US 12,388,280 B2
(45) Date of Patent: Aug. 12, 2025

(54) ADAPTIVE BATTERY CHARGING BASED ON BATTERY MEASUREMENTS DURING DISCHARGING PULSE

(71) Applicant: Gbatteries Energy Canada Inc., Ottawa (CA)

(72) Inventor: Mykola Sherstyuk, Ottawa (CA)

(73) Assignee: Gbatteries Energy Canada Inc., Ottawa (CA)

( * ) Notice: Subject to any disclaimer, the term of this patent is extended or adjusted under 35 U.S.C. 154(b) by 688 days.

(21) Appl. No.: 17/641,617

(22) PCT Filed: Sep. 23, 2020

(86) PCT No.: PCT/CA2020/051267
§ 371 (c)(1),
(2) Date: Mar. 9, 2022

(87) PCT Pub. No.: WO2021/056102
PCT Pub. Date: Apr. 1, 2021

(65) Prior Publication Data
US 2022/0329098 A1    Oct. 13, 2022

Related U.S. Application Data

(60) Provisional application No. 62/904,225, filed on Sep. 23, 2019.

(51) Int. Cl.
*H02J 7/00* (2006.01)

(52) U.S. Cl.
CPC ........ *H02J 7/00712* (2020.01); *H02J 7/0063* (2013.01); *H02J 7/00711* (2020.01); *H02J 7/007184* (2020.01)

(58) Field of Classification Search
CPC .................................................. H02J 7/00712
USPC .......................................................... 320/128
See application file for complete search history.

(56) References Cited

U.S. PATENT DOCUMENTS

| | | | | |
|---|---|---|---|---|
| 3,597,673 A | * | 8/1971 | Burkett | H02J 7/00711 320/129 |
| 4,746,852 A | * | 5/1988 | Martin | H02J 7/00711 320/152 |
| 4,829,225 A | * | 5/1989 | Podrazhansky | H02J 7/00711 320/129 |
| 5,307,000 A | * | 4/1994 | Podrazhansky | H02J 7/00711 320/149 |
| 5,739,672 A | * | 4/1998 | Lane | H02J 7/00711 320/124 |

(Continued)

OTHER PUBLICATIONS

International Search Report for related application PCT/CA2020/051267 issued Nov. 25, 2020.

*Primary Examiner* — Jerry D Robbins

(57) ABSTRACT

Disclosed are methods, systems, and devices to adaptively charge a battery. Charging current is applied to charge the battery. After application of the charging current, at least one discharging pulse is applied to the battery. During an ON period of the discharging pulse, at least one battery parameter is measured. One or more charging parameters are adapted based on the at least one battery parameter as measured during the ON period of the discharging pulse. The battery is charged based on the adapted one or more charging parameters.

18 Claims, 7 Drawing Sheets

(56) References Cited

U.S. PATENT DOCUMENTS

| | | | |
|---|---|---|---|
| 6,232,750 B1 * | 5/2001 | Podrazhansky | H02J 7/00711 |
| | | | 320/139 |
| 2001/0009371 A1 * | 7/2001 | Podrazhansky | G01R 31/3835 |
| | | | 324/432 |
| 2016/0178706 A1 * | 6/2016 | Liu | G01R 31/392 |
| | | | 702/63 |
| 2016/0272080 A1 * | 9/2016 | Chang | B60L 53/62 |
| 2018/0013306 A1 | 1/2018 | Tkachenko et al. | |
| 2018/0219390 A1 | 8/2018 | Tkachenko et al. | |
| 2019/0081486 A1 | 3/2019 | Tkachenko et al. | |

* cited by examiner

ADAPTIVE BATTERY CHARGING BASED ON BATTERY MEASUREMENTS DURING DISCHARGING PULSE

CROSS REFERENCE TO RELATED APPLICATIONS

This application is a National Phase filing under 35 U.S.C. § 371 of International Application No. PCT/CA2020/051267, filed on Sep. 23, 2020, which claims priority to U.S. Provisional Patent Application No. 62/904,225, filed on Sep. 23, 2019, the contents of both of which are incorporated herein by reference in their entirety for all purposes.

TECHNICAL FIELD

The present specification relates to battery charging, and in particular to adaptive battery charging based on battery measurements taken during a discharging pulse applied during charging a battery.

BACKGROUND

Advancements in battery technology have not kept up with market demand. There is a need to improve performance of battery systems. In particular, there is a need to improve a speed of charging of a battery as well as a life of the battery (in terms of years and in terms of charge/discharge cycles).

SUMMARY

According to an implementation of the present specification, there is provided a method to charge a battery, the method comprising: applying charging current to the battery; after applying the charging current, applying at least one discharging pulse to the battery; measuring at least one battery parameter during an ON period of the at least one discharging pulse; adapting one or more charging parameters based on the measured at least one battery parameter; and charging the battery based on the adapted one or more charging parameters.

The applying the charging current to the battery may comprise applying pulsed charging current to the battery.

The applying the charging current to the battery may comprise applying constant charging current to the battery.

The applying the charging current to the battery may comprise applying alternating current (AC) to the battery.

The measuring the at least one battery parameter may comprise determining a rate of change of voltage, corresponding to the battery, during the ON period of the at least one discharging pulse, wherein the voltage corresponds to a closed circuit voltage (CCV) of the battery.

The adapting the one or more charging parameters may comprise adapting one or more of: discharging current corresponding to the discharging pulse, and the ON period of the discharging pulse.

The adapting the one or more charging parameters may comprise adapting one or more parameters of charging pulses to be applied to the battery subsequent to applying the discharging pulse.

The adapting the one or more parameters of the charging pulses may comprise adapting one or more of: an ON period, a frequency, or a duty cycle of the charging pulses.

The adapting the one or more charging parameters may comprise adapting a value of charging current to be applied to the battery subsequent to applying the discharging pulse.

The battery may be one of a lithium ion battery or a silicon anode battery.

According to another implementation of the present specification, there is provided an apparatus to charge a battery, the apparatus comprising: at least one processor; and a non-transitory computer-readable storage medium configured to store instructions, wherein the instructions, in response to execution, by the at least one processor, cause the at least one processor to perform or control performance of operations that comprise: apply charging current to the battery; after application of the charging current, apply at least one discharging pulse to the battery; measure at least one battery parameter during an ON period of the at least one discharging pulse; adapt one or more charging parameters based on the at least one battery parameter; and charge the battery based on the adapted one or more charging parameters.

The charging current may be a pulsed charging current.

The charging current may be a constant charging current.

The charging current may be an alternating current (AC).

The operation to measure the at least one battery parameter may comprise an operation to determine a rate of change of voltage, corresponding to the battery, during the ON period of the at least one discharging pulse, and wherein the voltage corresponds to a closed circuit voltage (CCV) of the battery.

The operation to adapt the one or more charging parameters may comprise an operation to adapt one or more of: discharging current corresponding to the discharging pulse, and the ON period of the discharging pulse.

The operation to adapt the one or more charging parameters may comprise an operation to adapt one or more parameters of charging pulses to be applied to the battery subsequent to application of the discharging pulse.

The one or more parameters of the charging pulses may comprise one or more of: an ON period, a frequency, or a duty cycle of the charging pulses.

The operation to adapt the one or more charging parameters may comprise an operation to adapt charging current to be applied to the battery subsequent to application of the discharging pulse.

The battery may be one of a lithium ion battery or a silicon anode battery.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION OF THE DISCLOSURE

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprise," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meaning as commonly understood by one of ordinary skill in the art to which this disclosure belongs.

Figure 1:
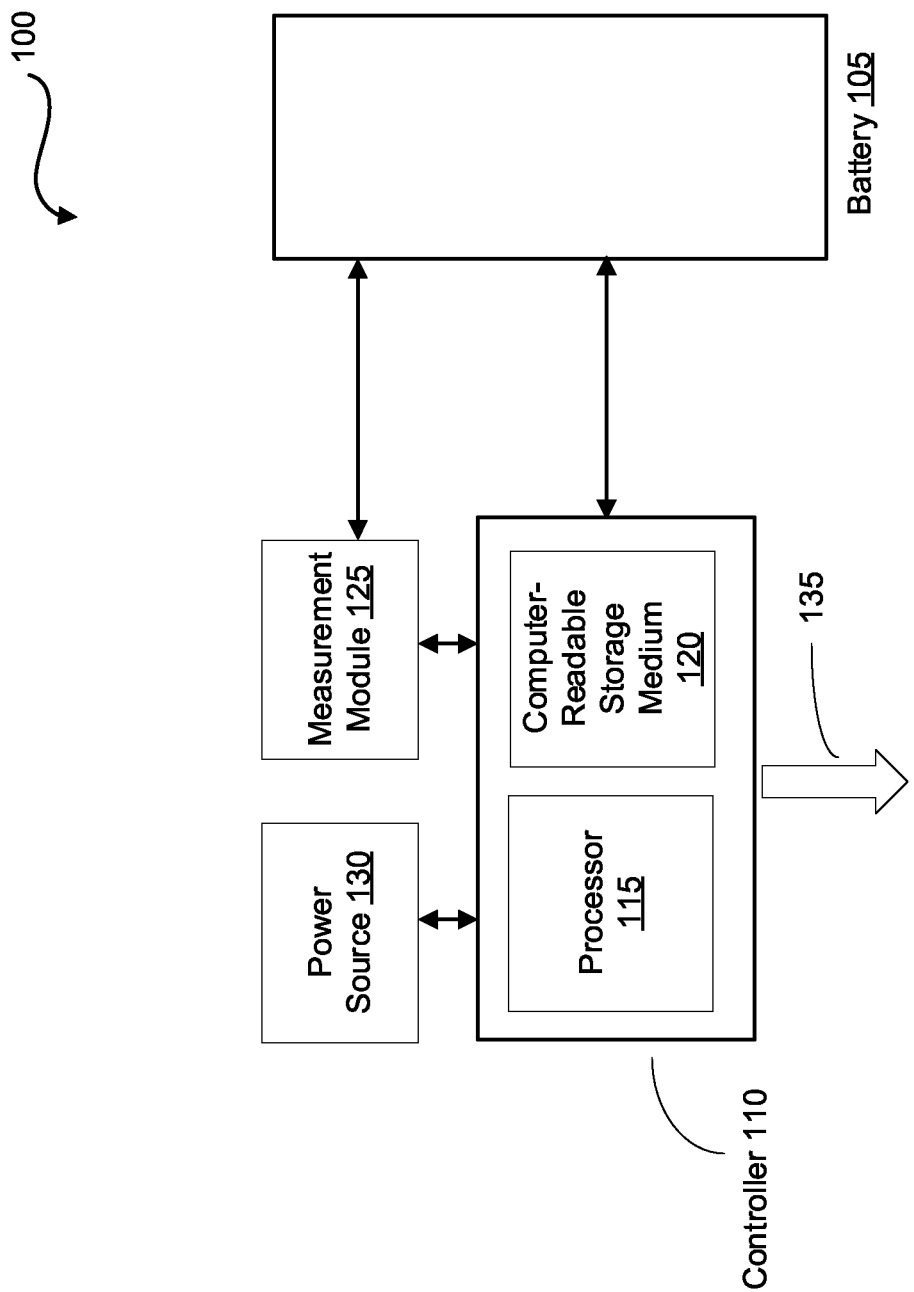
FIG. 1 shows a block diagram of an example battery system, in accordance with a non-limiting implementation of the present specification.

FIG. 1 shows an example battery system 100 in accordance with a non-limiting implementation of the present specification. The battery system 100 comprises a battery 105. In some implementations, the battery 105 may be a single battery cell. In some implementations, the battery 105 may be a battery pack which may comprise a plurality of rechargeable battery cells. In some implementations, the battery cells inside the battery pack may be arranged in many configurations, e.g., series-connected battery cells, parallel-connected battery cells, or a combination of series-connected and parallel-connected battery cells. In some implementations, the battery 105 may include a plurality of battery modules connected to each other in series or parallel, each battery module may further include battery cells arranged in different series and parallel configurations.

In some implementations, the battery 105 may be one of a lithium ion battery or a silicon anode battery. In some implementations, the battery 105 may comprise, but not limited to, lithium metal battery cell(s), sodium ion battery cell(s), nickel cadmium battery cell(s), nickel metal hydride battery cell(s), lead acid battery cell(s), solid state battery cell(s), or the like. The systems, methods, and devices described herein are not limited by the number or type of battery cells in the battery 105.

The battery system 100 further comprises a controller 110, which is operatively coupled to the battery 105. The controller 110 may control charging of the battery 105 in accordance with the methods described herein. For example, the controller may perform or control performance of operations of an example method 300 illustrated in FIG. 3, an example method 500 illustrated in FIG. 5, or an example method 600 illustrated in FIG. 6. The controller 110 may comprise a processor 115 to control charging of the battery 105 in accordance with the present specification. The controller 110 may further comprise a non-transitory computer-readable storage medium 120 which may store instructions, which are executable by the processor 115 for the controller 110 to perform or control performance of operations in relation to charging of the battery 105 in accordance with the methods described herein. The computer-readable storage medium 120 may be a computer memory or storage device which may be any suitable memory apparatus, such as, but not limited to ROM, PROM, EEPROM, RAM, flash memory, disk drive and the like. In some implementations, the processor 115 may execute the instructions stored in the computer-readable storage medium 120 which may cause the controller 110 to perform or control performance of an example method 300 illustrated in FIG. 3, an example method 500 illustrated in FIG. 5, or an example method 600 illustrated in FIG. 6.

In some implementations, the controller 110 may facilitate charging of the battery 105 by employing any of the charging protocols, including but not limited to, CC-CV charging protocol, a pulse charging protocol, a constant current protocol, a constant voltage protocol, and the like.

In some implementations, the controller 110 may be a microcontroller and may comprise a central processing unit (e.g., processor 115) to process instructions and data, on-board memory to store instructions and data, a digital to analog converter for analog data conversion obtained from other modules of the battery system 100, and drive circuitry for control of the various modules of the battery system 100.

In some implementations, the controller 110 (e.g., processor 115) may also monitor (e.g., measure) various parameters of the battery 105, and use the monitored parameters to manage operation of the battery 105. The various parameters monitored by the controller 110 may comprise, but not limited to, voltage, current, state of charge (SoC), temperature, state of health, and the like. Additionally, the controller 110 (e.g., processor 115) may calculate various values, which include but not limited to charge current limit (CCL), discharge current limit (DCL), energy delivered since last charge or discharge cycle, internal impedance, and charge delivered or stored (coulomb counter) for the battery 105 as well as individual battery cells when the battery 105 is a battery pack.

In some implementations, the controller 110 may operate as a battery management system (BMS) of the battery 105, and perform all such functions as performed by the BMS. The BMS is essentially "brain" of a battery and controls charging and discharging of the battery among other operations. The controller 110 may act as an active BMS that adapts charging and discharging of the battery 105 in real-time by monitoring real-time electrochemical and macrokinetic processes that occur within the battery 105, and/or battery cells comprised within the battery 105. The controller 110 may perform active BMS functions (e.g., control charging and discharging of the battery 105) as described in commonly owned U.S. patent application Ser. No. 15/644, 498 and commonly owned U.S. patent application Ser. No. 15/939,018.

In some implementations, the controller 110 may implement a battery model that may be used to determine how the charging parameters may be adapted in accordance with the method disclosed herein. Such a battery model may be built during the battery characterization or battery training. For example, in the characterization phase, the battery 105 may be slowly charged for a number of cycles, and optimized battery charging parameters (e.g., optimized for speed of charge, for cycle life of battery, and/or for calendar life of battery) may be determined from such slow charging cycles. Such optimized charging parameters may be registered, and the battery model may be built. In an example, battery parameters such as capacity, and CCV of the battery (e.g., during discharging pulse) may be stored against discharging pulse parameters and/or charging pulses parameters, and make-up the battery model. Such battery model may be used by the controller 110 to adapt battery charging as disclosed herein.

In some implementations, the controller 110 may include an artificial intelligence-based logic (e.g., implemented by the processor 115), and the controller 110 may be a self-learning controller. Such a controller may build the battery model during actual charging of the battery, and may learn how to adapt the battery charging based on the data in the battery model and/or based on actual battery measurements performed during charging of the battery.

The controller 110 may be configured to generate control pulses that are provided to a plurality of switches (not shown in the drawings) to control operation of the switches to produce the charging pulses and/or discharging pulses to charge the battery 105. In accordance with the present disclosure, in an example, the controller 110 may modulate the frequency (e.g., pulse period) of the control pulses. For example, the controller 110 may control the duration of the ON period and the OFF period of each control pulse that leads to modulation of the pulse period of the charging pulses and/or discharging pulses. In some embodiments, for example, the switches may be field effect transistor (FET) devices. The switches may be controlled (ON, OFF) to provide charging and/or discharging pulses to the battery 105.

The battery system 100 further comprises a measurement module 125 (e.g., sensors and associated circuitry) to measure various parameters of the battery 105 and/or battery cells of the battery 105. In some implementations, the measurement module 125 is operatively coupled to the battery 105 and the controller 110, and may be controlled by the controller 110 to perform various measurement related operations to charge or discharge the battery 105 in accordance with the methods disclosed herein. The measurement module 125 may comprise various sensors, such as, but not limited to, ammeter, voltmeter, temperature sensor, coulomb counter, and the like. In some examples, the measurement module 125 may also comprise some mechanical sensors such as, but not limited, to piezo-electric sensors (for determining battery swelling which is indicative of imbalance in the battery pack or mechanical stress inside the battery).

Various parameters that may be measured by the measurement module 125 and as controlled by the controller 110 may comprise voltage (e.g., open circuit voltage (OCV), closed-circuit voltage (CCV), current (e.g., charging current or discharging current), temperature, state-of-charge (SoC), and the like), for the battery 105 as well as individual battery cells of the battery 105.

In some implementations, the measurement module 125 may be implemented as a component of the controller 110. In such implementations, the controller 110 may be configured to measure and determine values of various parameters (such as of current, voltage, temperature, SoC, or the like) for the battery 105.

The battery system 100 may further comprise a power source 130, which may be, for example, a dedicated adaptor, such as AC-to-DC wall adapter. In most cases, such adaptors are designed with the specific battery charging needs in mind, and thus the source capabilities of the power source 130 allow for proper capacity-based charging current of batteries, such as battery 105. In some implementations, the power source 130, may be, for example, a non-dedicated adaptor, such as a universal charger not necessarily designed with any specific battery capacity in mind. As another example, the power source 130 may be a communication or computer bus voltage signal, intended to provide power to a number of devices connected in parallel or serially to the bus. One non-limiting example of this type of voltage source is a Universal Serial Bus (USB) connection, which provides a voltage bus (VBUS) signal from which a constrained amount of current may be drawn. Another example of the power source 130 may be a USB-C connector, which is a 24-pin USB connector system, which is distinguished by its two-fold rotational-symmetrical connector. The controller 110 may interface with the power source 130 to obtain power to facilitate charging of the battery 105 in accordance with the present disclosure.

In some implementations, the power source 103 may be a charging device for electric vehicles (e.g., charging station or an electric vehicle (EV) charger).

The battery system 100 may further comprise a communication interface 135 for the controller 110 to communicate with the hardware within the battery 105, and with load associated with the battery 105. For example, the communication interface 135 may enable communication of the controller 110 with a master controller of the load associated with the battery 105. The load may include but not limited to, a mobile phone, an electric vehicle, a laptop, a personal assistant device, or any other device or system to which the battery 105 supplies power. Simply stated, the communication interface 135 may enable communication of the controller 110 with a central processing unit of a device or a system which is powered by the battery 105. Such communication may be to at least control or coordinate charging and/or discharging of the battery 105 in accordance with the methods disclosed herein.

It is contemplated that a person of ordinary skill in the art may vary implementation of the battery system 100 and such variations are within the scope of the present disclosure. For example, the controller 110 may be implemented as a component of the power source 130. In some implementations, the controller 110 may be housed in a housing of the power source 130 (e.g., an EV charging station). Similarly, in other implementations, the controller 110 may be implemented as a component of the battery 105. In some implementations, the controller 110 may be housed in a housing of the battery 105. In some implementations, the controller 110 may be implemented as a separate module (e.g., add-on module) which may interface with the power source 130 (e.g., an EV charging station) to perform adaptive charging of the battery 105 in accordance with the methods disclosed herein.

Another such example variation may be that the functionality of the controller 110 may be implemented in two different controllers, such as a charging controller, and a discharging controller. The charging controller may be operative to apply charging current to the battery, and the discharging controller may be to apply discharging current or discharging pulses to the battery during charging of the battery in accordance with the methods disclosed herein. One of the charging controller and the discharging controller may perform or control performance of rest of the operations of an example method 300 illustrated in FIG. 3 an example method 500 illustrated in FIG. 5, or an example method 600 illustrated in FIG. 6. In an example, the charging controller may be implemented as a component of the power source 130 (e.g., an EV charging station), and the discharging controller may be implemented in a separate add-on module that may interface with the battery 105 and the power source 130.

Figure 2:
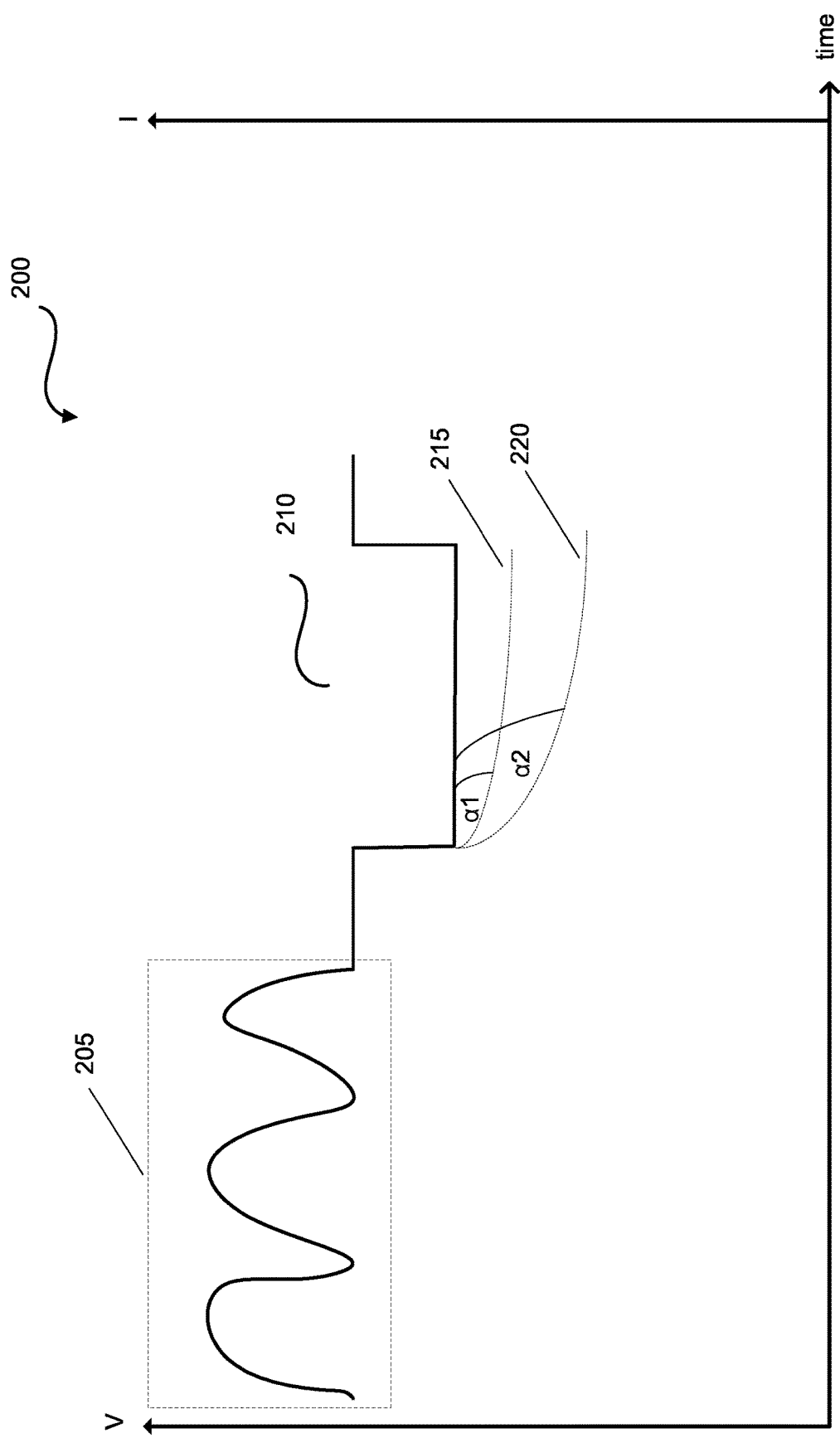
FIG. 2 illustrates an example implementation of battery charging, in accordance with a non-limiting implementation of the present specification.

FIG. 2 illustrates an example implementation 200 of battery charging, in accordance with a non-limiting implementation of the present specification.

As may be seen in FIG. 2, to charge the battery, the charging current is applied to a battery (e.g., battery 105). The charging current 205 is represented by a sinusoidal waveform 205. However, in some implementations, a sequence (e.g., train) of charging pulses (e.g., a pulsed charging current) is applied to the battery. In some implementations, a constant current (CC) may be applied to charge the battery. In other words, in some implementations, the battery charging may be initiated in a constant current (CC) charging mode. In some implementations, alternating current (AC) may be applied to charge the battery 105. The applying of the charging current to the battery 105 may be performed or controlled by the controller. For example, the controller 110 may apply the charging current to charge the battery 105. The controller 110 may obtain power from the power source 130 to initiate charging of the battery 105.

In some implementations, to initiate charging of the battery, the charging parameters of the charging current or charging pulses, such as but not limited to frequency, amplitude, pulse width, or the like, may be determined based on battery characterization. For example, the controller 110 may determine initial charging parameters on type of the battery (e.g., battery 105), battery specifications, charging hardware (e.g., power source) specifications or limitations, or the like.

After application of the charging current, at least one discharging pulse 210 may be applied to the battery. In some implementations, the controller 110 may apply the charging current to the battery 105 for a particular amount of time before applying the at least one discharging pulse 210. For example, the controller 110 may apply the train of charging pulses to the battery 105 for the particular amount of time before deciding to apply the at least one discharging pulse. In some implementations, a pause (having a predefined or dynamic duration) may be taken after application of the plurality of charging pulses and before application of the at least one discharging pulse to the battery. In some implementations, there may be no pause between the application of the charging pulses and the discharging pulses. In some implementations, a constant current may be applied to the battery, instead of or in addition to the charging pulses, followed by the discharging pulse(s), to charge the battery.

In some implementations, the controller 110 may determine when to apply the at least one discharging pulse based on one or more battery parameters, such as but not limited to, state of charge (SoC) of the battery 105. In some implementations, the controller 110 may decide to apply the at least one discharging pulse after detecting that the SoC of the battery has changed by a particular amount. For example, after every 1% change in SoC of the battery 105, the controller 110 may apply one or more discharging pulses to the battery 105. In other examples, the controller 110 may apply the discharging pulse to the battery 105 after every 0.5%, 2%, 5%, or any other percentage change in SoC of the battery 105, and thus adapt the battery charging process after every a particular change in a value of the SoC of the battery.

In some implementations, the controller 110 may determine parameters of the discharging pulse 210 to be applied based on the battery measurements which may include but not limed to SoC of the battery 105, temperature, or voltage measurements such as open circuit voltage (OCV) or closed circuit voltage (CCV) corresponding to the battery 105, or the like. In some implementations, the controller 110 may select pulse parameters such as amplitude, pulse width, or the like, of the discharging pulse 210 from a look-up table which may be generated during battery characterization. In some implementations, the controller 110 may determine parameters of the discharging pulse 210 to be applied to the battery 105 based on a value of the charging current or parameters of charging pulses, preceding the discharging pulse 210, applied to the battery 105.

After applying the discharging pulse 210, the controller 110 may measure (e.g., using the measurement module 125) one or more battery parameters during an ON period of the discharging pulse 210. Based on the measured battery parameter(s), the controller 110 may adapt charging of the battery. In some implementations, the controller 110 may adapt parameters of charging pulses to be applied to the battery subsequent to the discharging pulse 210 based on the measured battery parameter. Such parameters of the charging pulses may include, but not limited to, an ON period, a frequency, or a duty cycle of the charging pulses. In some implementations, the controller 110 may adapt or modify charging current to be applied to the battery subsequent to applying the discharging pulse. For example, the controller 110 may increase or decrease the charging current to be applied to the battery subsequent to applying the discharging pulse.

In some implementations, the battery parameter measured during the ON period of the discharging pulse 210 may comprise a rate of change of battery voltage (e.g., closed circuit voltage (CCV)) of the battery. For example, after applying the discharging pulse 210, the controller 110 may determine to see if the current has become constant or reached a particular value. After the determination, the controller 110 may determine or measure a rate of change of CCV of the battery 105. For example, the controller 110 may obtain CCV values as measured by a voltmeter of the measurement module 125, and may determine the rate of change of CCV based on those values. In some implementations, the controller 110 may determine a second derivative or a third derivative (or a further derivative) of the rate of change of voltage. Based on the measured rate of change of voltage (CCV) or the derivatives thereof, the controller 110 may adapt the charging parameters.

It is contemplated that the rate of change of CCV of the battery is indicative of polarization that builds inside the battery while the battery is being charged. In other words, the change of voltage or rate of change of voltage, when the discharging current or discharging pulse is applied to the battery during charging the battery, is indicative of state of health of the battery. Thus, based on the determination of state of health (or state of polarization) of the battery, the battery charging may be adapted.

In FIG. 2, the voltage curve 215 illustrates a first rate of change of voltage ($\alpha 1$), which is indicative of the battery being in a polarized state, and the voltage curve 220 illustrates a second rate of change of voltage ($\alpha 2$), which is indicative of the battery being in a less or non-polarized state. Therefore, by analyzing the rate of change of voltage (during the discharging pulse), the polarization of the battery, and thus state of health of the battery may be estimated. Based on the state of health of the battery, the battery charging may be adapted.

In some implementations, the controller 110 may adapt the discharging pulse 210 itself based on the measured rate of change of CCV during the ON period of the discharging pulse 210. For example, the controller 110 may adapt (increase or decrease) the discharging current corresponding to the discharging pulse 210, and/or the ON period of the discharging pulse 210.

For example, the ON period of the discharging pulse 210 is considered to be made up of two components (a) a probing phase component of the ON period-during which the controller 110 may perform battery measurements (e.g., rate of change of CCV of the battery), and (ii) and an adaptation phase component of the ON period-during which the controller 110 may adapt the parameters of the discharging pulse 210 itself based on the battery measurements performed during the probing phase component. For example, during the probing phase component of the ON period of the discharging pulse, the controller 110 may determine how offset is the rate of change of CCV of the battery 105 from the ideal rate of change of CCV. Based on the determination, the controller 110 may adapt the adaptation phase component of the ON period of the discharging pulse 210 (e.g., ON period of the discharging pulse 210 may be made longer or shorter). The adaptation of the discharging pulse 210 based on the battery measurements done during the ON period of the discharging pulse 210 is illustrated more in detail in relation to FIGS. 4-7.

Figure 3:
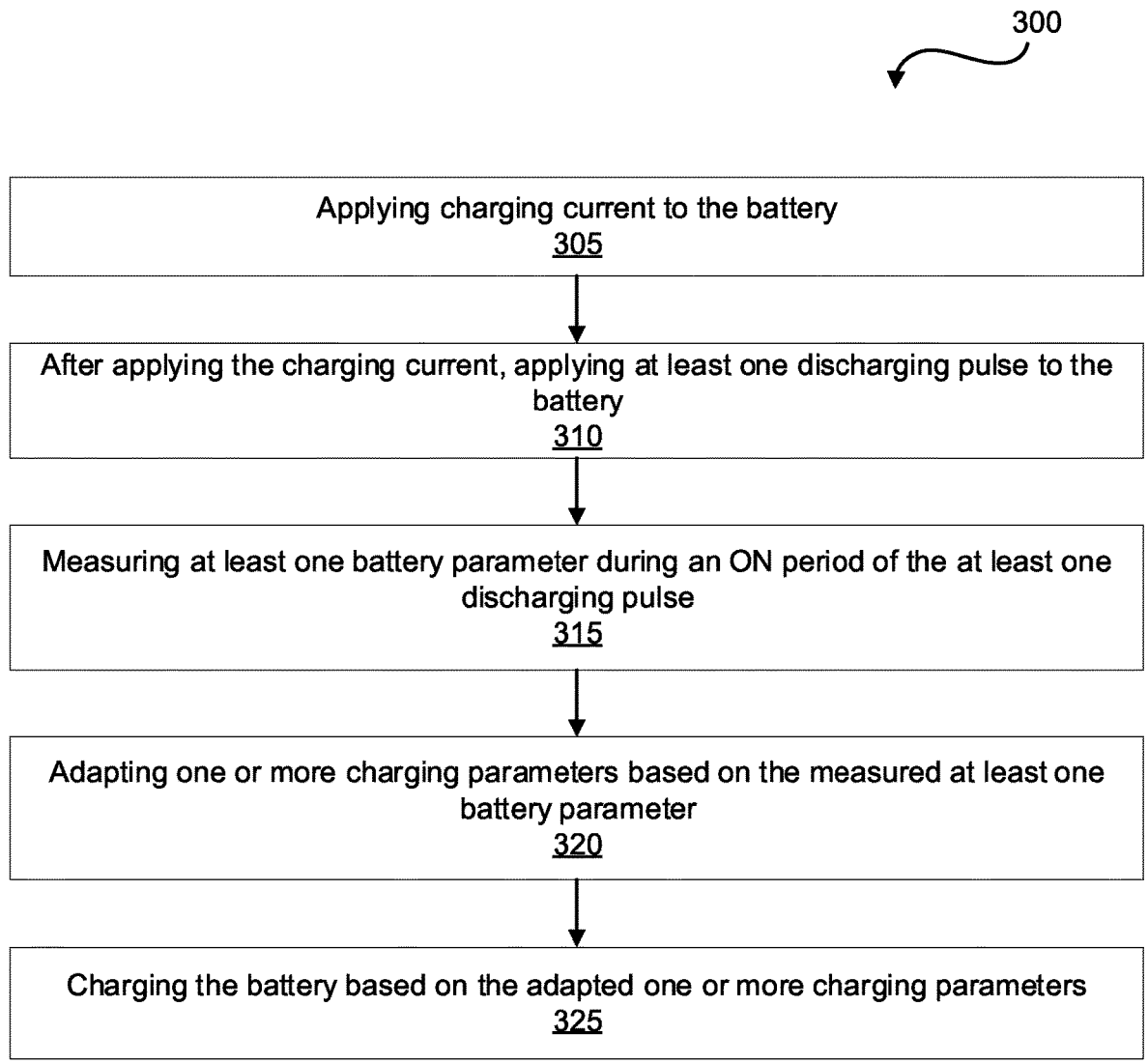
FIG. 3 shows a flowchart of an example method of adaptively charging a battery, in accordance with a non-limiting implementation of the present specification.

FIG. 3 is a flowchart illustrating an example method to adaptively charge the battery in accordance with a non-limiting implementation of the present specification. The method 300 illustrated in FIG. 3 may be performed by the controller 110 to adaptively charge the battery 105.

The method 300 begins at 305, where charging current is applied to the battery. In some examples, constant current (CC) is applied to the battery. In some implementations, a train of charging pulses (pulsed charging current) is applied to the battery. In some implementations, a constant charging current (CC) is applied to the battery. In some implementations, an alternating current is applied to the battery.

At 310, after application of the charging current, at least one discharging pulse is applied to the battery. As described previously, in some implementations, the discharging pulse may be applied after it is determined that the value of the SoC has changed by a particular amount.

At 315, during the ON period of the discharging pulse, at least one battery parameter is measured. In some implementations, a rate of change of voltage (e.g., closed circuit voltage) corresponding to the battery, during the ON period of the at least one discharging pulse, is measured as the battery parameter.

At 320, one or more charging parameters are adapted based on the measured battery parameter. In some implementations, the charging parameters may be adapted based on the rate of change of voltage (CCV) of the battery as measured during the ON period of the discharging pulse. In some implementations, the charging parameters that may be adapted may comprise discharging current corresponding to the discharging pulse, and the ON period of the discharging pulse. In some implementations, the charging parameters that may be adapted may comprise one or more parameters of charging pulses to be applied to the battery subsequent to applying the discharging pulse. The one or more parameters of the charging pulses may comprise, but not limited to, an ON period, a frequency, or a duty cycle of the charging pulses. In some implementations, the charging parameters that may be adapted may comprises charging current to be applied to the battery subsequent to applying the discharging pulse. The value of charging current may be increased or decreased based on the measured battery parameter such as the rate of change of CCV of the battery. Similarly, the value of discharging current corresponding to the discharging pulse itself may be increased or decreased based on the rate of change of CCV of the battery. Similarly, the values of parameters such as, but not limited to, an ON period, a frequency, or a duty cycle of the charging pulses to be applied subsequent to the discharging pulse may be modified.

At 325, the battery may be charged based on the adapted one or more charging parameters. For example, the battery may be charged with the adapted charging parameters until the charging parameters are adapted again based on the measurements during the discharging pulse as described herein, or until the battery is fully charged. In other words, the charging parameters adaptation is a continuous process which may be performed for several times in a same charging cycle. For example, as stated above, the discharging pulse may be applied to the battery when the SoC changes by a particular value or amount (e.g., 1%, 2%, 5%, or the like). Therefore, the charging parameters adaptation may be performed every time the SoC changes by the particular value or amount (e.g., 1%, 2%, 5%, or the like).

Figure 4:
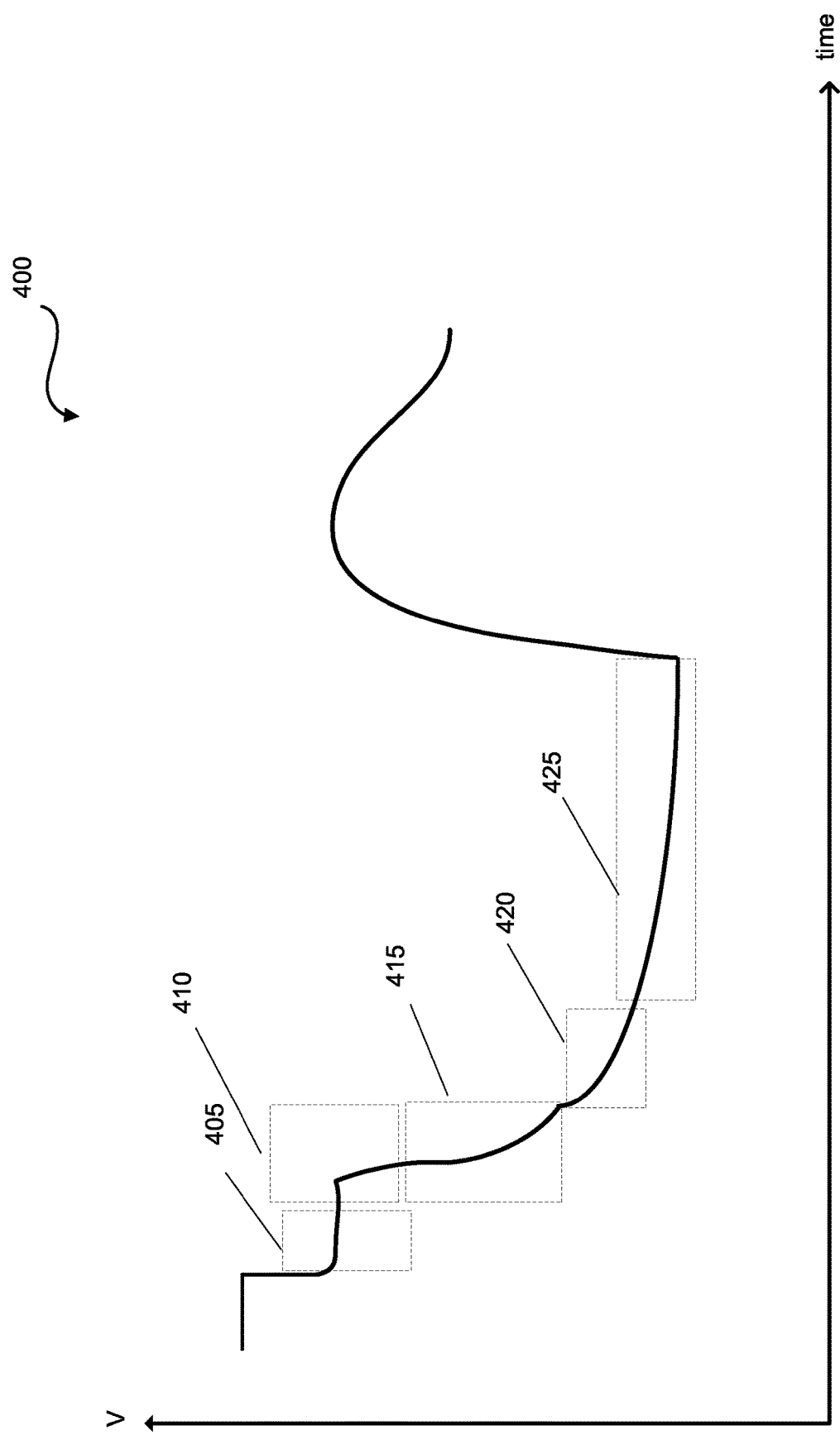
FIG. 4 illustrates an example battery voltage curve, in accordance with a non-limiting implementation of the present specification.

FIG. 4 illustrates an example voltage curve 400 of the battery (e.g., battery 105) depicting variation of a closed circuit voltage (CCV) of the battery after application of the discharging pulse as disclosed herein in accordance with the present disclosure. As may be seen in FIG. 4, the voltage curve 400 depicting a change in the CCV of the battery after application of the discharging pulse, is made up of multiple portions 405, 410, 415, 420, and 425. The voltage curve 400 shows a variation in CCV or a rate of change of CCV of the battery after the discharging current is applied to the battery. The voltage curve portion 405 may reflect voltage variation an in idle period (e.g., wait period) between a time when the charging current is turned OFF, and the discharging current is turned ON. Since the voltage curve portion 405 is based on the wait period between the end of the charging current (e.g., charging pulses) and start of the discharging current (e.g., discharging pulse) being applied, it is variable. Therefore, the wait period is one of the variables that may be controlled to control overall charging process of the battery.

After the discharging pulse is applied, the controller (e.g., controller 110) may wait for the discharging current to stabilize (e.g., attain a target value) before making measurements of the battery parameter (e.g., rate of change of voltage). The voltage curve portion 410 may reflect voltage variation from a time when the discharging pulse is applied to a time when the discharging current stabilizes. Voltage drop such time period, as indicated by the voltage curve portion, is due to ohmic resistance of the battery, and is usually constant during charging of the battery. The voltage curve portion 410 may also be referred to as the target discharging current development portion.

When the controller 110 determines that the discharging current has reached a target value, the controller 110 may start measuring the battery parameter (e.g., rate of change of voltage or CCV of the battery). The voltage curve portion 415 may reflect a portion on the voltage curve 400 that corresponds to a time period when the rate of change of voltage is being determined by the controller 110 to determine the polarization inside the battery. For example, the controller 110 may determine the rate of change of CCV of the battery as indicated by the voltage curve portion 415, and based on the determined rate of change of CCV, the controller 110 may determine to adjust the discharging pulse itself, e.g., adjust the value of the discharging current and/or an ON period of the discharging pulse, or adjust charging parameters of charging pulses to be subsequently applied to the battery. For example, the controller 110 may determine that the rate of change of voltage has not reached an ideal value (based on the battery model) during the voltage curve portion 415, therefore the controller 110 may decide to increase the ON period of the discharging pulse.

As may be seen in FIG. 4, the voltage curve 400 also comprises another voltage curve portion 420, which is different from the voltage curve portion 415. The voltage curve portion 420 is indicative of a second rate of change of battery voltage which is different from a rate of change of battery voltage as indicated by the voltage curve portion 415. The controller 110 may also determine the rate of change of voltage during the time period corresponding to the voltage curve portion 420, to assess the battery condition and thus adapt the charging process. It is contemplated that the voltage curve 400 may comprise any number of portions (similar to shown portions 415, and 420) corresponding to which battery parameter measurements are done. Simply stated, the controller 110 may control or perform battery parameter measurements until the rate of change of voltage stabilizes or attain a target value. The voltage curve portion 425 is is indicative of stabilization of rate of change of voltage, after which the charging current (e.g., pulsed charging current) having adapted charging parameters may be applied to charge the battery. Simply stated, when the CCV corresponding to the battery is not substantially dropping (e.g., CCV remains largely constant) as indicated by the stabilized voltage curve portion 425, the controller may decided to stop applying the discharging current, and switch to applying the charging current to the battery.

In some implementations, ratio of voltage drop as indicates by different voltage curve portions (e.g., voltage curve portions 415, and 420) may be used by the controller 110 to adapt the charging parameters. For example, the controller 110 may calculate a ratio of different rate of change of voltages during the ON period of the discharging pulse, and may adapt the charging parameters based on the determined ratio. In some implementations, a mathematical model taking such ratios into considered may be built and implemented by the controller 110 for the adaptive battery charging.

Figure 5:
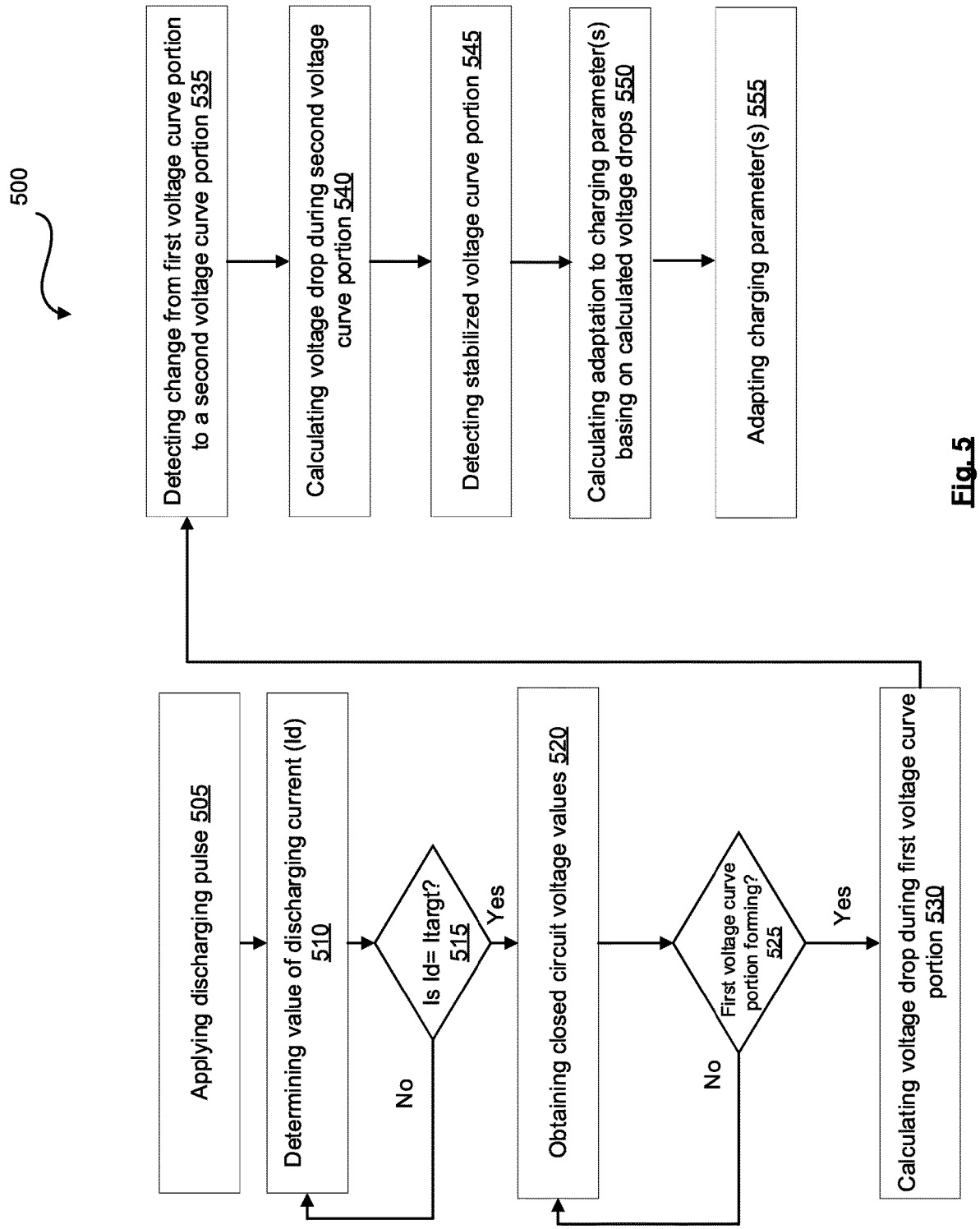
FIG. 5 is a flowchart of an example method of measuring closed circuit voltage (CCV) of the battery during the discharging pulse, and adapting battery charging thereafter in accordance with a non-limiting implementation of the present specification.

FIG. 5 is a flowchart illustrating an example method of measuring closed circuit voltage (CCV) of the battery during the discharging pulse, and adapting charging parameters thereafter in accordance with a non-limiting implementation of the present specification. The method 500 illustrated in FIG. 5 may be performed by the controller 110 to adaptively charge the battery 105.

The method 500 begins at 505 where, after application of the charging current, at least one discharging pulse is applied to the battery.

At 510, a value of discharging current of the battery is determined.

At 515, it is determined whether the discharging current of the battery has reached a target value. If it is determined that the discharging current has yet not reached the target value, the value of the discharging current is again determined until a determination is made that the discharging current has reached the target value. The target value of the discharging current may be based on the battery characterization and may vary based on the type of the battery, life of the battery, health of the battery, SoC of the battery, and the like.

Upon determining that the discharging current has reached the target value, at 520, the one or more closed circuit voltage (CCV) values may be obtained. For example, the CCV corresponding to the battery 105 may be measured by the measurement module 125, and the CCV values as measured by the measurement module 125 may be obtained by the controller 110.

At 525, it may be determined if the CCV values are indicative of a first voltage curve portion (e.g., portion 415) of a CCV voltage curve. Simply stated, based on the obtained CCV values, it may be determined if the CCV values are indicative of a first slope of the voltage curve. For example, the controller 110 may calculate a first derivative of a rate of change of voltage based on the CCV values, and based on the calculated first derivative of the rate of change of voltage, the controller 110 may determine if the first slope of the voltage curve is forming, where the first slope corresponds to the first voltage curve portion (e.g., portion 415). If the first slope is not yet determined to be forming, the process of obtaining CCV values continue until the determination of the first slope being forming is determined.

At 530, upon determining that the first slope or first voltage curve portion is forming, the voltage drop during the first voltage curve portion is determined.

At 535, a change from the first voltage curve portion (e.g., portion 415) to a second voltage curve portion (e.g., portion 420) is determined. For example, the controller 110 may determine a change in slope of the voltage curve based on the CCV values, which may be indicative of transition from the first voltage curve portion to the second voltage curve portion. Simply stated, the controller 110 may determine the slope of the voltage curve (derivative of rate of change of CCV) which may be indicative of the transitioning.

At 540, upon determining the formation of the second slope, the voltage drop during the second voltage curve portion is determined. As stated previously, it is contemplated that the voltage curve 400 may comprise any number of portions (similar to shown portions 415, and 420) before the voltage or the rate of change of voltage stabilizes, therefore at 540, the voltage drop during such N portions may be determined until the stabilized CCV of the battery is detected.

At 545, a stabilized voltage curve portion (e.g., portion 425) is detected. For example, the controller 110 may determine based on the CCV values that the rate of change of voltage has stabilized, e.g., the rate of change of voltage has become substantially constant, or has attained the target value.

At 550, the adaptation of the charging parameters may be determined based on the calculated voltage drops during different slopes or voltage portions of the voltage curve. In some implementations, the charging parameters that may be adapted may comprise discharging current corresponding to the discharging pulse, and the ON period of the discharging pulse itself. In some implementations, the charging parameters that may be adapted may comprise one or more parameters of charging pulses to be applied to the battery subsequent to applying the discharging pulse. The one or more parameters of the charging pulses may comprise, but not limited to, an ON period, a frequency, or a duty cycle of the charging pulses. In some implementations, the charging parameters that may be adapted may comprise charging current to be applied to the battery subsequent to applying the discharging pulse. For example, the controller may determine the respective offset values for the charging parameters, the respective offset values indicating a respective value by which initially selected charging parameter value (e.g., selected before the battery parameter measurement) be offset by to adapt the charging parameters, and thus adapt the battery charging process.

At 555, the charging parameters may be adapted as calculated, and the battery may be charged based on the adapted charging parameters.

Figure 6:
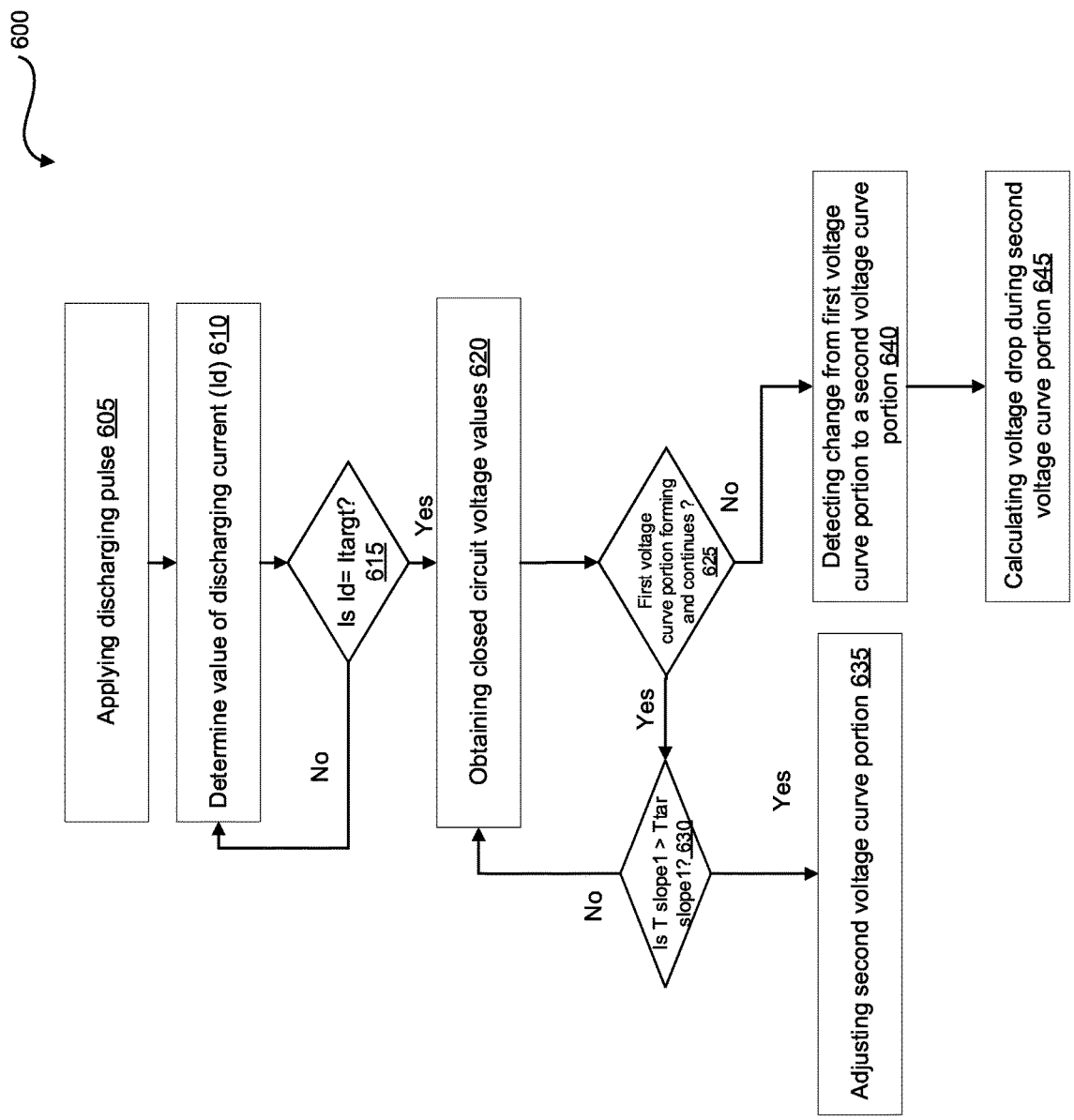
FIG. 6 is a flowchart of another example method of measuring closed circuit voltage (CCV) of the battery during the discharging pulse, and adapting battery charging thereafter in accordance with a non-limiting implementation of the present specification.

FIG. 6 is a flowchart illustrating another example method of measuring closed circuit voltage (CCV) of the battery during the discharging pulse, and adapting battery charging thereafter in accordance with a non-limiting implementation of the present specification. The method 600 illustrated in FIG. 6 may be performed by the controller 110 to adaptively charge the battery 105.

The method 600 begins at 605 where, after application of the charging current, at least one discharging pulse is applied to the battery.

At 610, a value of discharging current of the battery is determined.

At 615, it is determined whether the discharging current of the battery has reached a target value. If it is determined that the discharging current has yet not reached the target value, the value of the discharging current is again determined until a determination is made that the discharging current has reached the target value. The target value of the discharging current may be based on the battery characterization and may vary based on the type of the battery, life of the battery, health of the battery, SoC of the battery, or the like.

Upon determining that the discharging current has reached the target value, at 620, the one or more closed circuit voltage (CCV) values may be obtained. For example, the CCV corresponding to the battery 105 may be measured by the measurement module 125, and the CCV values as measured by the measurement module 125 may be obtained by the controller 110.

At 625, it may be determined if the CCV values are indicative of a first voltage curve portion (e.g., portion 415) of a CCV voltage curve (e.g., curve 400). Simply stated, based on the obtained CCV values, it may be determined if the CCV values are indicative of a first slope of the voltage curve. For example, the controller 110 may calculate a first derivative of a rate of change of voltage based on the CCV values, and based on the calculated first derivative of the rate of change of voltage, the controller 110 may determine if the first slope of the voltage curve is forming, where the first slope corresponds to the first voltage curve portion (e.g., portion 415). If the first slope is not yet determined to be forming, the process of obtaining CCV values continue until the determination of the first slope being forming is determined.

At 630, upon determining that the first voltage curve portion is forming, it is determined if the slope of the first voltage curve portion is greater than the target slope of the first voltage curve portion.

After determining that the slope of the first voltage curve portion is greater than the target slope of the first voltage curve portion, at 635, the second voltage curve portion may be adjusted. Simply stated, the controller 110 may determine that the first derivative of the rate of change of CCV corresponding to the battery 105 as seen during the probing phase component of the discharging pulse is greater than the target value, the discharging current and/or the ON period of the discharging pulse itself may be adapted based on the offset of the slope from the ideal value, which may be in addition to or alternative to adaptation of the parameters of the charging current or charging pulses to be subsequently applied.

At 640, a change from the first voltage curve portion (e.g., portion 415) to a second voltage curve portion (e.g., portion 420) is detected. For example, the controller 110 may determine a change in slope of the voltage curve based on the CCV values, which may be indicative of transition from the first voltage curve portion to the second voltage curve portion. Simply stated, the controller 110 may determine the slope of the voltage curve (derivative of rate of change of CCV) which may be indicative of the transitioning.

At 645, upon determining the formation of the second slope, the voltage drop during the second voltage curve portion is determined. As stated previously, it is contemplated that the voltage curve 400 may comprise any number of portions (similar to shown portions 415, and 420) before the voltage or the rate of change of stabilizes, therefore at 640, the voltage drop during such N portions may be determined until the stabilized portion of the voltage curve is detected. As stated previously in relation to FIG. 4, the method 600 may continue with the charging parameters being adapted based on the calculated voltage drops or the calculated rate of change of voltage, and the battery is being charged based on the adapted charging parameters.

Figure 7:
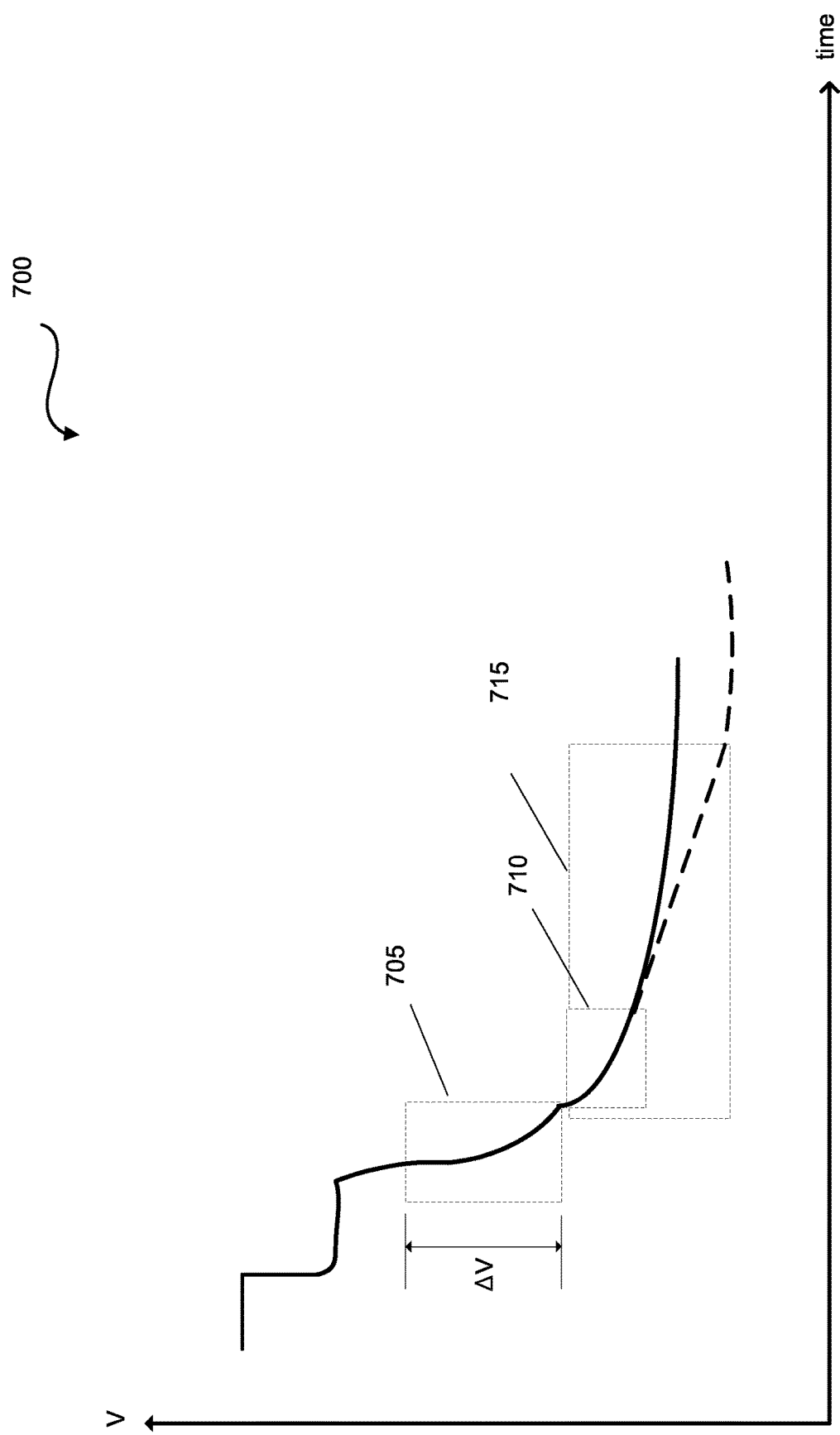
FIG. 7 illustrates an example battery voltage curve corresponding to an adapted discharging pulse, in accordance with a non-limiting implementation of the present specification.

FIG. 7 illustrates an example battery voltage curve 700 corresponding to the adapted discharging pulse, in accordance with a non-limiting implementation of the present specification. As stated previously in relation to method 600 of FIG. 6, the slope of the first voltage curve portion is calculated to determine if the slope of the first voltage curve portion is greater than the target value of the slope. Such first voltage curve portion is illustrated as 705 in FIG. 7. The voltage drop $\Delta V$ corresponding to the first voltage curve portion 705 may be determined. Further based on the voltage drop, the slope of the first voltage curve portion 705 may be determined. If the slope of the first voltage curve portion 705 is determined to be greater than the target value. In other words, if the derivative of the rate of change of voltage $\Delta V/\Delta t$ corresponding to the first voltage curve portion 705 is determined to be greater than the target value of the derivative, then the discharging pulse may be adjusted. For example, the discharging current for the remaining of the discharging pulse or the ON period of the discharging pulse may be modified which results in adjusted second voltage curve portion 715 which is different than the original (before adaptation) second voltage curve portion 710.

The methods and systems disclosed herein provide for adaptation of the discharging pulse itself on the fly, which is used for the battery measurements also, which allows for the compensation of the damage inside the battery which may occur prior to application of the discharging pulse. Simply stated, based on the battery measurements done during the ON period of the discharging pulse, if it is determined that the battery is polarized more than expected, the discharging pulse may be applied for the longer period of time, or the higher discharging current may be applied to the battery to lessen the polarization inside the battery.

It is also contemplated that the discharging pulse applied to the battery during charging of the battery is longer in duration than the charging pulses, hence it is more practical to make measurements and do analysis (e.g., to determine state of health of the battery) during the discharging pulse (rather than the charging pulses) to adapt charging of the battery. It is further noted that the adaptation of charging parameters for the battery as disclosed by the methods herein results in significantly reduced temperature elevation inside the battery (as compared to conventional techniques of charging the battery), which not only increases the life of the battery, but also enables fast charging of the battery without damaging the battery.

Adaptive battery charging methods disclosed herein have shown significant beneficial results when used for charging of the silicon anode batteries. Recently, silicon (Si) has emerged as one of the most promising electrode materials for next-generation battery cells. It provides a low voltage for an anode and a high theoretical specific capacity of ~4,200 mAh/g. However, Si expands volumetrically by up to 400% upon lithiation, and it can contract significantly upon lithium extraction (dilithiation). Such volumetric changes create two critical problems related to usage of silicon-based anode materials: degradation of the mechanical integrity of Si electrodes and the stability of the solid electrolyte interface SEI. The stress induced by the large volume changes causes cracking and pulverization of Si anodes. This results in reduction of electrical contact and capacity fading. This is considered to be the main reason for the rapid capacity loss in early studies of Si anodes Implementing discharging pulses following the periods of continuous charge current or periods of charging pulses applied to the battery as disclosed herein allows electrodes within the battery to incrementally adjust to volumetric changes caused by ion insertion or removal. These volumetric changes to the electrodes occur in small bi-directional steps during such a method of control. This further allows the ion transportation and insertion/extraction to be more uniform across the entire surface of active material. The volumetric changes occur in a more elastic fashion and so prevent and/or greatly reduce mechanical stress on the electrode. The bidirectional movement in some cases switches between non-symmetrical and symmetrical modes depending on stage of pulse sequence and state of the battery charge and health.

The use of real time adaptive discharging pulses as disclosed herein allow to compensate for the volumetric changes of Si based electrode. Further, the methods of discharging pulse measurement disclosed herein allows to detect and estimate volumetric change phases of Si-based anode (which may be deduced based on the rate of change of voltage measurement). Based on such estimation, the discharging pulse itself (e.g., an adaptation phase component of the discharging pulse) and/or charging parameters of subsequent charging pulses may be adapted.

It will be appreciated that the modules, processes, systems, and sections described above can be implemented in hardware, hardware programmed by software, software instructions stored on a non-transitory computer readable medium or a combination of the above. A system and/or a module as described above, for example, can include a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a non-transitory computer-readable medium such as a computer memory or storage device which may be any suitable memory apparatus, such as, but not limited to ROM, PROM, EEPROM, RAM, flash memory, disk drive, or the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the methods and systems (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed methods, systems, and computer program product (or software instructions stored on a non-transitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed methods, systems, and computer readable media (or computer program product) can be implemented in software executed on a programmed general purpose computer, a special purpose computer, a microprocessor, a network server or switch, or the like.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method to charge a battery, the method comprising:
applying charging current to the battery;
after applying the charging current, periodically applying at least one discharging pulse to the battery during the battery charging process;
measuring at least one battery parameter during an ON period of the at least one discharging pulse;
determining, based on the measured at least one battery parameter, if the battery is polarized more than expected;
in response to determining that the battery is polarized more than expected, adaptively adjusting a subsequent portion of the at least one discharging pulse, wherein adaptively adjusting the subsequent portion of the at least one discharging pulse comprises: applying the at least one discharging pulse for a longer period of time, applying higher discharging current for a subsequent portion of the discharging pulse, or applying lower discharging current for the subsequent portion of the discharging pulse;
adapting one or more charging parameters subsequent to application of the at least one discharging pulse; and
charging the battery based on the adapted one or more charging parameters.

2. The method of claim 1, wherein applying the charging current to the battery comprises applying pulsed charging current to the battery.

3. The method of claim 1, wherein applying the charging current to the battery comprises applying constant charging current to the battery.

4. The method of claim 1, wherein applying the charging current to the battery comprises applying alternating current (AC) to the battery.

5. The method of claim 1, wherein measuring the at least one battery parameter comprises determining a rate of change of voltage, corresponding to the battery, during the ON period of the at least one discharging pulse, and wherein the voltage corresponds to a closed circuit voltage (CCV) of the battery.

6. The method of claim 1, wherein adapting the one or more charging parameters comprises adapting one or more parameters of charging pulses to be applied to the battery subsequent to applying the discharging pulse.

7. The method of claim 6, wherein adapting the one or more parameters of the charging pulses comprises adapting one or more of: an ON period, a frequency, or a duty cycle of the charging pulses.

8. The method of claim 1, wherein adapting the one or more charging parameters comprises adapting a value of charging current to be applied to the battery subsequent to applying the discharging pulse.

9. The method of claim 1, wherein the battery is one of a lithium ion battery, a lithium metal battery, or a silicon anode battery.

10. An apparatus to charge a battery, the apparatus comprising:
at least one processor; and
a non-transitory computer-readable storage medium configured to store instructions, wherein the instructions, in response to execution, by the at least one processor, cause the at least one processor to perform or control performance of operations that comprise:
apply charging current to the battery;
after application of the charging current, periodically apply at least one discharging pulse to the battery during the battery charging process;
measure at least one battery parameter during an ON period of the at least one discharging pulse;
determine, based on the measured at least one battery parameter, if the battery is polarized more than expected;
in response to determining that the battery is polarized more than expected, adaptively adjust a subsequent portion of the at least one discharging pulse, wherein adaptively adjusting the subsequent portion of the at least one discharging pulse comprises: applying the at least one discharging pulse for a longer period of time, applying higher discharging current for a subsequent portion of the discharging pulse, or applying lower discharging current for the subsequent portion of the discharging pulse;
adapt one or more charging parameters subsequent to application of the at least one discharging pulse; and
charge the battery based on the adapted one or more charging parameters.

11. The apparatus of claim 10, wherein the charging current is a pulsed charging current.

12. The apparatus of claim 10, wherein the charging current is a constant charging current.

13. The apparatus of claim 10, wherein the charging current is an alternating current (AC).

14. The apparatus of claim 10, wherein the operation to measure the at least one battery parameter comprises an operation to determine a rate of change of voltage, corresponding to the battery, during the ON period of the at least one discharging pulse, and wherein the voltage corresponds to a closed circuit voltage (CCV) of the battery.

15. The apparatus of claim 10, wherein the operation to adapt the one or more charging parameters comprises an operation to adapt one or more parameters of charging pulses to be applied to the battery subsequent to application of the discharging pulse.

16. The apparatus of claim 15, wherein the one or more parameters of the charging pulses comprise one or more of: an ON period, a frequency, or a duty cycle of the charging pulses.

17. The apparatus of claim 10, wherein the operation to adapt the one or more charging parameters comprises an operation to adapt charging current to be applied to the battery subsequent to application of the discharging pulse.

18. The apparatus of claim 10, wherein the battery is one of a lithium ion battery, a lithium metal battery, or a silicon anode battery.

* * * * *